(12) United States Patent
Lipka et al.

(10) Patent No.: US 8,494,005 B2
(45) Date of Patent: Jul. 23, 2013

(54) TECHNIQUE FOR ADJUSTING A PHASE RELATIONSHIP AMONG MODULATION SYMBOLS

(75) Inventors: Dietmar Lipka, Berg (DE); Stefan Zuerbes, Heroldsberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 273 days.

(21) Appl. No.: 12/938,825

(22) Filed: Nov. 3, 2010

(65) Prior Publication Data

US 2011/0103405 A1 May 5, 2011

Related U.S. Application Data

(60) Provisional application No. 61/262,684, filed on Nov. 19, 2009.

(30) Foreign Application Priority Data

Nov. 3, 2009 (EP) .................... 09013796

(51) Int. Cl.
*H04J 1/00* (2006.01)
*H04B 7/208* (2006.01)
*H04W 4/00* (2009.01)
*H03C 1/52* (2006.01)
*H03C 3/00* (2006.01)
*H04L 27/04* (2006.01)
*H04L 27/06* (2006.01)
*H04L 27/12* (2006.01)
*G03H 1/08* (2006.01)

(52) U.S. Cl.
USPC ........... 370/480; 370/344; 370/328; 375/300; 375/340; 359/9; 332/100; 332/144

(58) Field of Classification Search
USPC ....... 370/344, 480, 328; 375/300, 340; 359/9; 332/100, 144
See application file for complete search history.

(56) References Cited

U.S. PATENT DOCUMENTS 5,589,955 A * 12/1996 Amako et al. .................... 359/9
5,825,257 A * 10/1998 Klymyshyn et al. .......... 332/100

(Continued)

FOREIGN PATENT DOCUMENTS

| EP | 2 091 194 A1 | 8/2009 |
|---|---|---|
| EP | 2091194 A1 | 8/2009 |

OTHER PUBLICATIONS

Whitney (How DO VLBI Correlators Work, IVS 2000 General Meeting Proceedings, MIT Haystack Observatory, 2000, hereinafter "Whitney").*

(Continued)

*Primary Examiner* — Andrew Lai
*Assistant Examiner* — Albert Shih

(57) ABSTRACT

A technique for adjusting a phase relationship among modulation symbols is disclosed. A method embodiment of this technique comprises the steps of applying to a sequence of modulation symbols a phase ramp that continuously increases over the duration of the symbol sequence, and applying a compensation phase to each modulation symbol to introduce a phase offset between two subsequent modulation symbols. The joint application of the phase ramp and the compensation phase can be used to establish a saw tooth-like phase characteristic over the sequence of modulation symbols. In one embodiment, the phase ramp is applied in the context of impressing a frequency shift on the modulation symbols.

23 Claims, 3 Drawing Sheets

U.S. PATENT DOCUMENTS

| | | | |
|---|---|---|---|
| 6,600,382 B1* | 7/2003 | Klymyshyn | 332/144 |
| 2010/0329229 A1* | 12/2010 | Lipka et al. | 370/344 |
| 2012/0044871 A1* | 2/2012 | Li et al. | 370/328 |

OTHER PUBLICATIONS

Huang et al (Impact of Radio Resource Allocation and Pulse Shaping on PAPR of SC-FDMA Signals, the 18th Annual IEEE International Symposium on Personal, Indoor and Mobile Radio Communication, Sep. 2007).*

LTE; Evolved Universal Terrestrial Radio Access (E-UTRA); Physical channels and modulation (3GPP TS 36.211 version 8.7.0 Release 8) Technical Specification, European Telecommunications standards institute (ETSI), 650, Route Des Lucioles; F-06921 Sophia-Antipolis: France, No. V8.7.0, Jun. 1, 2009, XP014044748.

* cited by examiner

US 8,494,005 B2

TECHNIQUE FOR ADJUSTING A PHASE RELATIONSHIP AMONG MODULATION SYMBOLS

CROSS REFERENCE TO RELATED APPLICATIONS

This application claims the benefit of U.S. Provisional Application No. 61/262,684, filed Nov. 19, 2009, the disclosure of which is incorporated herein by reference.

BACKGROUND

The present disclosure generally relates to signal processing. In particular, a technique for adjusting a phase relationship among modulation symbols is presented.

In multi-transmitter communications networks, channel access techniques allow multiple transmitters connected to the same physical channel to share its transmission capacity. Various such channel access techniques are known in the art. For example, in second generation communications systems according to the Global System for Mobile communications (GSM) standard, Time Division Multiple Access (TDMA) techniques are utilized to divide a specific frequency channel into individual time slots assigned to individual transmitters. In third generation communications systems, Code Division Multiple Access (CDMA) techniques divide channel access in the signal space by employing a combination of spread spectrum operations and a special coding scheme in which each transmitter is assigned an individual code.

The next advance in wireless communications systems considers Orthogonal Frequency Division Multiple Access (OFDMA) techniques to achieve still higher bit rates. One major advantage of OFDMA techniques over other channel access techniques is their robustness in the presence of multi-path signal propagation. On the other hand, the waveform of OFDMA signals exhibits very pronounced envelope fluctuations resulting in a high Peak-to-Average Power Ratio (PAPR). Signals having a high PAPR require highly linear power amplifiers to avoid excessive inter-modulation distortion, and the power amplifiers have to be operated with a large back-off from their peak power. These demands result in a lower power efficiency, which places a significant burden specifically on battery operated transmitters as utilized in mobile telephones and similar portable user equipment. The high PAPR inherent to OFDMA techniques is to a certain extent overcome by Single Carrier Frequency Division Multiple Access (SC-FDMA) techniques.

The Third Generation Partnership Project (3GPP) is considering using both OFDMA and SC-FDMA in next generation communications systems currently standardized in the Long Term Evolution (LTE) project. According to Section 5 of the 3GPP Technical Specification (TS) 36.211 "Physical Channels and Modulation", V8.7.0 of May 2009, SC-FDMA will be implemented in LTE user equipment for the uplink direction towards the access network. OFDMA, on the other hand, will be used in the downlink direction from the LTE access network towards the user equipment.

An exemplary realization of an SC-FDMA modulator stage 10 for LTE user equipment is schematically illustrated in FIG. 1 (PRIOR ART). The modulator stage 10 receives as input signal a multilevel sequence of complex-valued data symbols in one of several possible modulation formats such as Binary Phase Shift Keying (BPSK) or 16 level Quadrature Amplitude Modulation (16-QAM). The data symbols are received by the modulator stage 10 in blocks containing N symbols each.

Every block of N data symbols is initially subjected to an N-point Discrete Fourier Transform (DFT) in a DFT block 12. The DFT block 12 spreads the N data symbols over M frequency points or sub-carriers (N<M) to obtain a frequency domain representation of the N data symbols that is input to a mapping block 14. The mapping block 14 outputs a set of M complex-valued sub-carrier amplitudes. Exactly N of these amplitudes (corresponding to the M data symbols) will be non-zero, while the remaining amplitudes have been set to zero. The N subcarrier amplitudes output by the mapping block 14 are transformed by an Inverse Fast Fourier Transform (IFFT) block 16 back into a time domain signal comprising the resulting SC-FDMA modulation symbols. Except for an omission of the DFT block 12 used to spread the bits of the input symbols over the available subcarriers, an OFDMA modulator stage has a similar configuration as the SC-FDMA modulator stage 10 shown in FIG. 1. For this reason, SC-FDMA is sometimes also interpreted as DFT-spread OFDMA.

FIG. 2 (PRIOR ART) illustrates a transmitter stage comprising the SC-FDMA modulator stage 10 of FIG. 1 (PRIOR ART). As generally shown in FIG. 2 (PRIOR ART), the modulation symbols output by the modulator stage 10 are subjected to further signal processing steps before being up-converted to Radio Frequency (RF) and transmitted.

In a first processing step, a Cyclic Prefix (CP) is inserted into each SC-FDMA modulation symbol. The CP provides a guard-time between two sequentially transmitted symbols or symbol blocks to reduce mutual interference caused by multi-path propagation. After the CP has been added, a phase rotation is individually applied to each SC-FDMA modulation symbol. The phase rotation impresses a frequency shift on the modulation symbols that amounts to half the distance between two adjacent sub-carriers, i.e. to 7.5 kHz. This frequency shift reduces interference by the direct current transmitter offset. After the phase rotation operation, the modulation symbols are properly scaled for digital-to-analog signal conversion before being up-converted to RF, amplified and transmitted via one or more antennas.

In the signal processing scenario illustrated in FIG. 2 (PRIOR ART), it would generally be possible to impress the frequency shift in the frequency domain by the SC-TDMA modulator stage 10 when performing the sub-carrier mapping. However, in the specific configuration of the SC-FDMA modulator stage 10, only integer multiples of the sub-carrier distance can be impressed given an IFFT size of N. The LTE specifications define a frequency shift amounting to a fraction of the sub-carrier distance. The frequency shifting operation in the transmitter stage 18 is therefore carried out downstream of the modulator stage 10 in the time domain using a phase rotation (as increasing the IFFT size is computationally expensive).

In an effort to simplify the frequency shifting operation in the time domain, one may think of impressing the frequency shift during up-conversion by tuning the local oscillator to $f_{RF}$+7.5 kHz. Such an approach introduces a continuous phase ramp over a sequence of modulation symbols as shown in the upper portion of FIG. 3 (FIG. 3 illustrates the phase relationship among a sequence of four modulation symbols). The LTE specifications, however, define a symbol-wise phase ramp that crosses zero after the CP of each modulation symbol (see lower portion of FIG. 3). Accordingly, impressing a continuous phase ramp over multiple modulation symbols would corrupt the phase relationship among the modulation symbols.

EP 2 091 194 A1 teaches an SC-FDMA modulator stage comprising one or multiple phase rotation blocks. In one implementation, a phase rotation block is located downstream of an FFT/IFFT combination.

SUMMARY

Therefore, a technique for adjusting a phase relationship among modulation symbols is required.

According to a first aspect, a method of adjusting a phase relationship among modulation symbols is provided. The method comprises applying to a sequence of modulation symbols a phase ramp that continuously increases over the duration of the symbol sequence, and applying a compensation phase to each modulation symbol to introduce a phase offset between two subsequent modulation symbols.

The joint application of the phase ramp and the compensation phase will result in a desired phase characteristic over the sequence of modulation symbols. The desired phase characteristic will have a saw tooth-like form.

The application of the phase ramp and the application of the compensation phase may be performed in any order. In other words, the application of the phase ramp may precede the application of the compensation phase, or the application of the compensation phase may precede the application of the phase ramp. The phase ramp may be applied intentionally to establish a targeted phase characteristic. The phase ramp may also be applied as a by-product of another signal processing operation.

As an example, the phase ramp may be applied in other context of impressing a frequency shift on the modulation symbols. The frequency shift may be impressed in different ways. According to a first variant, the frequency shift is impressed using a dedicated frequency shifting operation. According to a further variant, the frequency shift is impressed together with up-converting the modulation symbols to RF.

The frequency shift may have a constant or a variable magnitude. The magnitude of the frequency shift may amount to a fraction of a distance between two adjacent sub-carriers assigned to the transmission of modulation symbols.

Similar to the phase ramp, the compensation phase may also be applied by a dedicated phase compensation operation or, alternatively, in the context of (e.g., together with) another signal processing operation. For example, the compensation phase may be applied in the context of a signal scaling operation. The signal scaling operation may be tailored to the range of a subsequent digital-to-analog signal conversion.

The phase offset may generally be introduced at any point within an individual modulation symbol. Alternatively, the phase offset may be introduced between the end of one modulation symbol and the start of the next modulation symbol.

The compensation phase may either change or may remain constant during the duration of a single modulation symbol. Moreover, the compensation phase that is introduced may vary from one modulation symbol to the next modulation symbol. As an example, the compensation phase $\varphi_l$ for modulation symbol l may be represented by $$\varphi_l = \left(\sum_{i=0}^{l} -\pi N_{cp,i}/N\right) \bmod(2\pi),$$

$N_{cp,i}$ being the length of a prefix of the modulation symbol and N being a constant.

The compensation phase may be calculated individually for each modulation symbol. To this end recursive calculation techniques may be employed. In other words, the compensation phase for one modulation symbol may be calculated recursively taking into account the compensation phase calculated for at least one preceding modulation symbol.

The phase adjustment technique presented herein may be applied in a wide variety of communications systems. As an example, the adjusted phase relationship may be compliant with 3GPP Release 8 or higher. Moreover, the modulation symbols may be compliant with a wide range of modulation schemes, such as digital modulation schemes including SC-FDMA and OFDMA.

The technique presented herein may be realised in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a hard disk, and so on. Moreover, the computer program product may be provided for download onto such a recording medium.

According to a further aspect, a device for adjusting a phase relationship among modulation symbols is provided. The device comprises a phase shifter adapted to apply to a sequence of modulation symbols a phase ramp that continuously increases over the duration of the symbol sequence, and a phase compensator adapted to apply a compensation phase to each modulation symbol to introduce a phase offset between two subsequent modulation symbols. The joint application of the phase ramp and the compensation phase will result in a desired phase characteristic over the sequence of modulation symbols. The desired phase characteristic will have a saw tooth-like form.

The phase shifter may be comprised by a frequency shifter adapted to impress a frequency shift on the modulation symbols. The frequency shifter may be a dedicated signal processing component or may be comprised by a signal up-converter. In a similar manner, the phase compensator may be realized in the form of a dedicated signal processing component or may be comprised by another signal processing component such as a signal scaler.

The device may further comprise a modulation stage upstream of the phase shifter and the phase compensator. The modulation stage may be compliant with SC-FDMA or OFDMA modulation techniques.

Also provided is a user terminal comprising such a device. The user terminal may be configured to support SC-FDMA or OFDMA and may be compliant with 3GPP Release 8 or higher (e.g., LTE or LTE-Advanced). Possible implementations of the user terminal include mobile telephones, network or data cards, portable computers with network access capabilities and so on.

BRIEF DESCRIPTION OF THE DRAWINGS

Further aspects and advantages of the technique presented herein will become apparent from the following description of preferred embodiments and the drawings, wherein.

DETAILED DESCRIPTION

In the following description of preferred embodiments, for purposes of explanation and not limitation specific details are set forth (such as particular signal processing components and sequences of processing steps) in order to provide a thorough understanding of the present disclosure. It will be apparent to one skilled in the art that the techniques described herein may be practiced in other embodiments that depart from these specific details. For example, while the following embodiments will primarily be described in the context of an SC-FDMA modulator stage, the technique presented herein can also be utilized in combination with other modulation schemes such as OFDMA. While the embodiments will relate to an exemplary LTE implementation in accordance with 3GPP Release 8, it will be readily apparent that the present technique may also be implemented in other communications networks such as LTE-Advanced networks.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the present technique may also be embodied in a computer program product as well as in a system comprising a computer processor and a memory coupled to the processor, wherein the memory is encoded with one or more programs that may perform the services, functions and steps disclosed herein.

Figure 4:
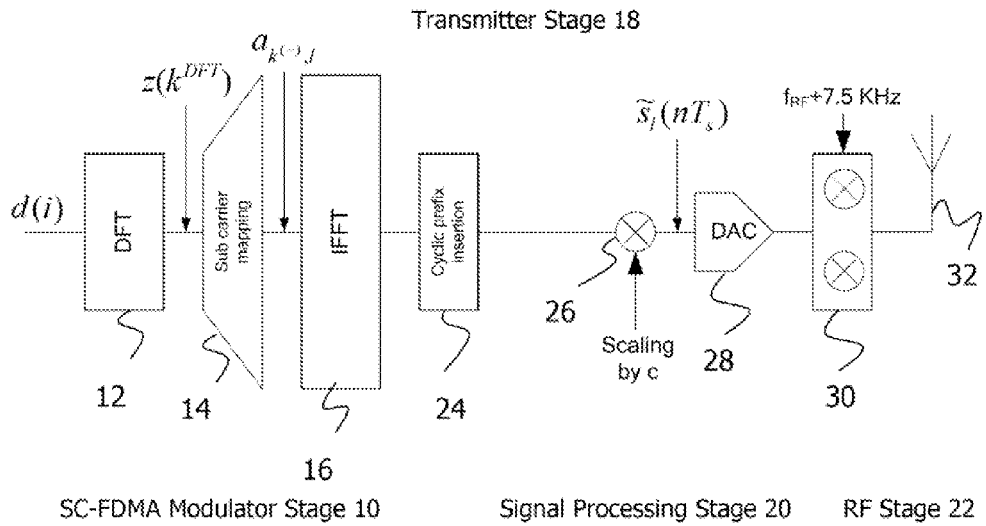
FIG. 4 schematically illustrates an embodiment of an SC-FDMA transmitter stage.

FIG. 4 shows an embodiment of an LTE transmitter stage 18 to be incorporated for example as a network card or data stick in a stationary or portable computer. The transmitter stage 18 comprises an SC-FDMA modulator stage 10, a signal processing stage 20 and an RF stage 22.

Figure 1:
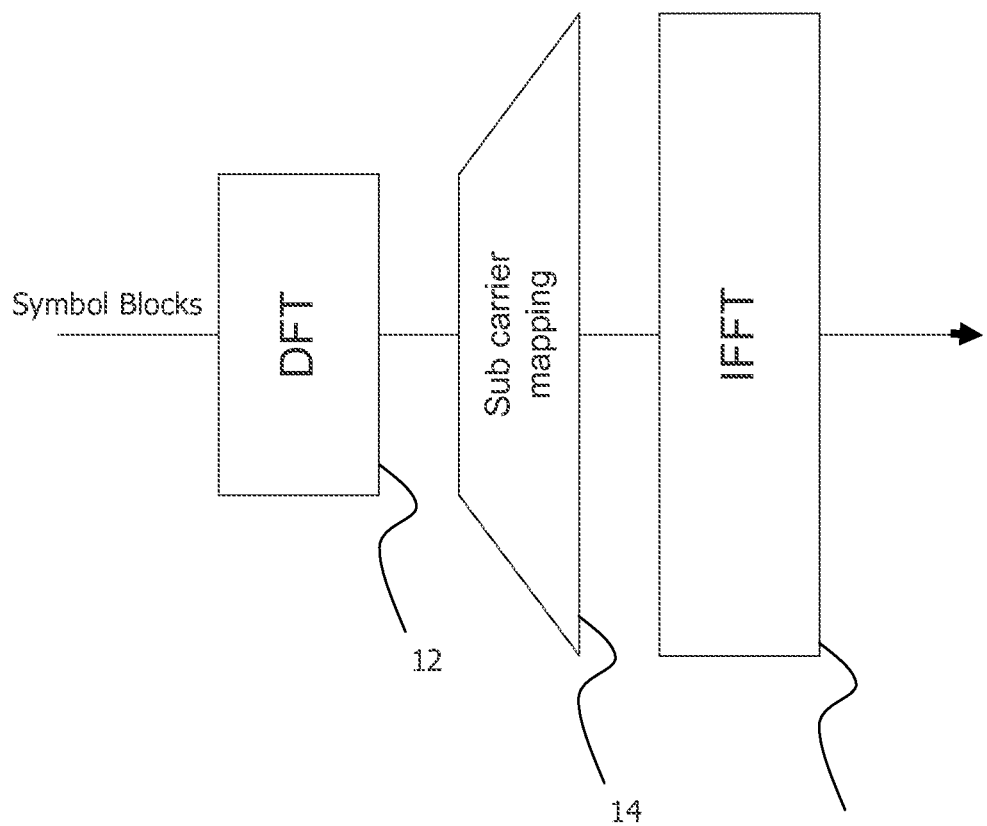
FIG. 1 (PRIOR ART) schematically illustrates an exemplary implementation of an SC-FDMA modulator stage.

The SC-FDMA modulator stage 10 performs the same basic SC-FDMA processing operations as described above with reference to FIGS. 1 and 2 (and will therefore not be discussed in more detail here). The signal processing stage 20 is coupled to an output to the SC-FDMA modulator stage 10 and comprises a cyclic prefix inserter 24, a signal scaler 26 as well as a digital-to-analog signal converter 28. The RF stage 22 is configured to up-convert an output signal of the digital-to-analog signal converter 28 into the RF range using an IQ modulator 30, and to amplify the up-converted signal prior to transmission via one or more antennas 32. It will be appreciated that the transmitter stage 18 may comprise further components not shown in FIG. 4.

In the following, the data processing operations of the individual components of the transmitter stage 18 as illustrated in FIG. 4 will be described in more detail. To better understand the implementation of these operations in the present embodiment, the nature of the SC-FDMA signal as defined in 3GPP TS 36.211 "Physical Channels and Modulation", V8.7.0 of May 2009 will be discussed first.

In accordance with the notation in 3GPP TS 36.211, the complex-valued data symbols received by the SC-FDMA modulator stage 10 are denoted d(i). The symbols $z(k^{DFT})$ that are to be mapped (by mapping block 14) on LTE Resource Elements (RE) $a_{k(-),l}$ are specified—for SC-FDMA symbol l=0, which does not restrict the generality—in Section 5.3.3 of 3GPP 36.211 as:

$$z(k^{DFT}) = \sum_{i=0}^{M_{sc}^{PUSCH}-1} d(i) \cdot e^{-j2\pi k^{DFT} i / M_{sc}^{PUSCH}}$$

for $0 \leq k^{DFT} < M_{sc}^{PUSCH}$, with $M^{PUSCH}_{sc}$ being the scheduled bandwidth for uplink transmission (expressed as a number of sub-carriers), and $k_{DFT}$ being a frequency domain index. This specification of $z(k^{DFT})$ corresponds to the Discrete Fourier Transform applied by the DFT block 12 of the SC-FDMA modulator stage 10.

The final time-continuous SC-FDMA signal is defined in Section 5.6 of 3GPP TS 36.211 as:

$$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k(-),l} \cdot e^{j2\pi(k+1/2)\Delta f(t-N_{CP,l}T_s)}$$

for $0 \leq t < (N_{CP,l} + N)T_s$, with sub-carrier spacing $\Delta f = 1/(NT_s)$ and CP length $N_{CP,l}$ for SC-FDMA modulation symbol l. The index l indicates the dependency of the CP length from the SC-FDMA symbol (the CP length is longer in the first SC-FDMA symbol of a sub-frame and may deviate from the default value due to timing adjustments).

With the number B of sub-carriers in one half of the available uplink spectrum being defined as:

$$B = N_{RB}^{UL} N_{sc}^{RB}/2,$$

one can rewrite the formula for the time-continuous SC-FDMA signal $s_l(t)$ to obtain an expression for discrete time samples n:

$$s_l(nT_s) = c \cdot \sum_{k=-B}^{B-1} a_{k(-),l} \cdot e^{j2\pi(k+1/2)(n-N_{CP,l})/N}$$

for $0 \leq n < (N_{CP,l} + N)$.

In this formula, the frequency shift by half the sub-carrier distance is given by the term $$p_{shift}(n) = e^{j2\pi(1/2)(n-N_{CP,l})/N} = e^{j\pi(n-N_{CP,l})/N},$$

which leads to $$s_l(nT_s) = c \sum_{k=-B}^{B-1} a_{k(-),l} \cdot e^{j2\pi k(n-N_{CP,l})/N} \cdot p_{shift}(n)$$

for $0 \leq n < (N_{CP,l} + N)$.

This definition is indicative of the Inverse Fast Fourier Transform applied to RE $a_{k(-),l}$ by IFFT block 16. Moreover, the definition also comprises a cyclic prefix insertion (by CP inserter 24) and a scaling by c (by signal scaler 26) downstream of the SC-FDMA modulator stage 10.

Figure 3:
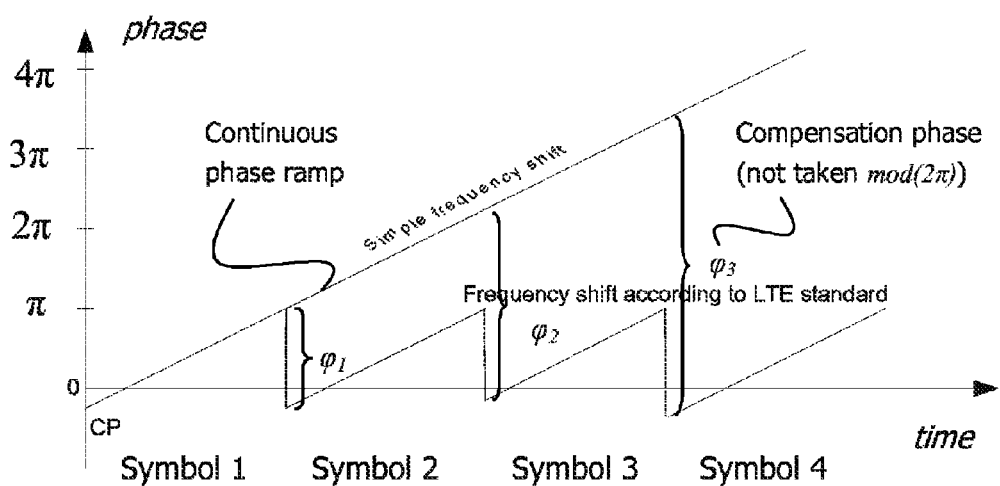
FIG. 3 is a schematic phase diagram illustrating two phase relationships among four modulation symbols.

As can be seen from the definition of $p_{shift}(n)$ above, for each individual SC-FDMA modulation symbol the phase starts for n=0 at a value of $-\pi N_{cp,l}/N$, increases continuously crossing the value zero, and (since $n<(N_{CP,l}+N)$) stops one sample before π as generally illustrated in the lower portion of FIG. 3. In the lower portion of FIG. 3 also shows the discontinuous saw tooth-like phase characteristic over a sequence of four SC-FDMA modulation symbols. This means that the phase ramp of each individual SC-FDMA modulation symbol starts at a value of $-\pi N_{cp,i}/N$ at the beginning of its CP.

Figure 2:
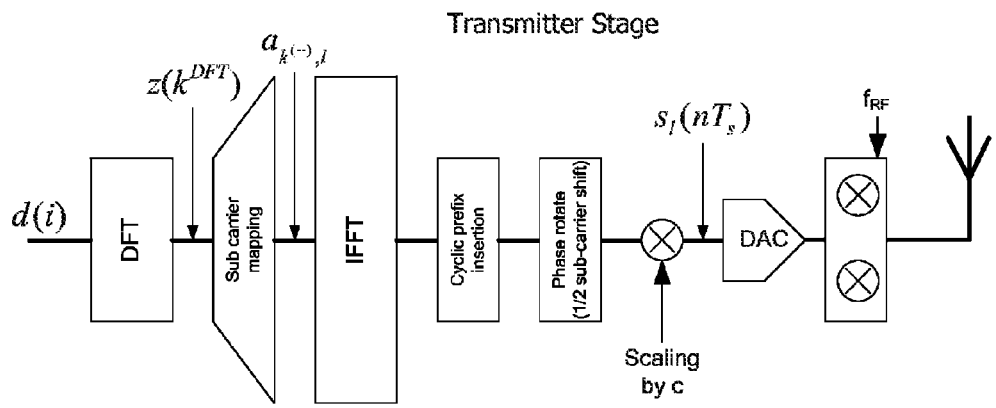
FIG. 2 (PRIOR ART) schematically illustrates a transmitter stage comprising the SC-FDMA modulator stage of FIG. 1.

To adjust such a phase relationship among subsequent modulation symbols, the conventional approach illustrated in FIG. 2 requires the provision of a dedicated phase rotator downstream of the SC-FDMA modulator stage 10. The phase rotator is needed to apply a symbol-wise phase ramp to each individual modulation symbol (in the context of the frequency shifting operation by half a subcarrier distance).

In the exemplary implementation of the transmitter stage 18 illustrated in FIG. 4, the phase rotator has been omitted as the frequency shift is impressed using the IQ modulator 30 by tuning a local oscillator (not shown) to $f_{RF}+7.5$ kHz. As discussed above, such an approach introduces a phase ramp that continuously increases over the duration of a symbol sequence as generally illustrated in the upper portion of FIG. 3. To obtain the saw tooth-like phase characteristic specified in 3GPP TS 36.211, the continuous phase ramp introduced by the IQ modulator 30 is compensated by a symbol-wise application of a compensation phase to each modulation symbol. In this way, a phase offset is introduced between two subsequent SC-FDMA modulation symbols.

To this end, each SC-FDMA symbol/has to be corrected by a constant compensation phase $\phi_l$ of $$\varphi_l = \left(\sum_{i=0}^{l} -\pi N_{cp,i}/N\right) \mod(2\pi)$$

This expression can be simplified by the recursion $$\phi_l = (\phi_{l-1} - \pi N_{cp,l}/N) \mod(2\pi),$$

where $\phi_0$ may be chosen arbitrarily, e.g. $\phi_0=0$.

To obtain the desired phase characteristic illustrated in the lower portion of FIG. 3, the compensation phase $\phi_l$ is introduced between the end of one SC-FDMA modulation symbol and the start of the next SC-FDMA modulation symbol.

Accordingly, the time-discrete SC-FDMA signal $\tilde{s}_l(nT_s)$ for an individual SC-FDMA modulation symbol before the signal converter 28 becomes $$\tilde{s}_l(nT_s) = a \cdot e^{j\varphi_l} \cdot \sum_{k=-B}^{B-1} a_{k(-),l} \cdot e^{j2\pi k(n-N_{CP,l})/N}$$

for $0 \le n < (N_{CP,l}+N)$, where $c=a \cdot e^{j\phi_l}$ is a constant amplitude and phase factor.

Figure 5:
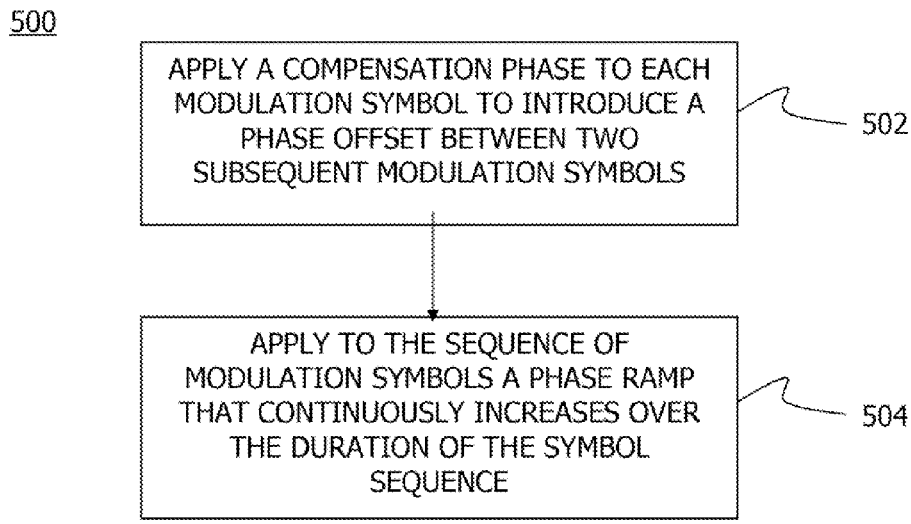
FIG. 5 shows a flow diagram according to a method embodiment.

The factor c is applied by the signal scaler 26, i.e., by a signal processing component that is anyhow needed. Referring to the flow diagram 500 of FIG. 5, the signal scaler 26 applies in a first step 502 to each individual SC-FDMA modulation symbol a compensation phase to introduce a phase offset between two subsequent symbols. After digital-to-analog signal conversion, the IQ modulator 30 then applies to a sequence of SC-FMDA modulation symbols a phase ramp that continuously increases over the duration of the symbol sequence (step 504). Such a phase ramp that continuously increases over the duration of four subsequent modulation symbols is exemplarily shown in the upper portion of FIG. 3.

As a result of the joint application of the phase ramp in step 504 and the compensation phase in step 502 a saw tooth-like phase characteristic is established over the sequence of SC-FDMA modulation symbols as shown in the lower portion of FIG. 3. Consequently, the phase relationship among the SC-FDMA modulation symbols will be adjusted in accordance with 3GPP TS 36.211.

It should be noted that the phase ramp could also be introduced by a signal processing component different from the IQ modulator 30 either in the digital or in the analog domain. For example, the phase ramp could also be applied by a dedicated phase shifter. It will also be appreciated that the compensation phase need not necessarily be applied by the signal scaler 26. As an alternative solution, a dedicated phase compensator may be provided to apply the compensation phase either in the digital or in the analog signal domain. Still further, the phase rotator, which has been omitted in the embodiment illustrated in FIG. 4, could be maintained for other purposes than impressing a frequency shift on the modulation symbols. For example, the phase rotator may be maintained to compensate for any phase errors introduced by the SC-FDMA modulator stage 10.

The technique for adjusting a phase relationship among modulation symbols presented herein is not limited to scenarios in which a frequency shift has to be impressed on modulation symbols. Rather, this technique may generally be applied in scenarios in which a saw tooth-like or similar phase characteristic has to be established among subsequent modulation symbols.

As has become apparent from the above embodiments, the phase adjustment technique presented herein can be implemented in a simple and efficient manner. In certain scenarios, phase rotators become obsolete or can at least be configured in a less complex fashion. For this reason, the number of calculation operations (e.g., multiplications) needed to generate an SC-FDMA or other signal can be reduced.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method implemented by a transmitter of adjusting a phase relationship among modulation symbols, the method comprising steps of:
    applying, by a transmitter's processor, to a sequence of modulation symbols a phase ramp that continuously increases over the duration of the symbol sequence; and
    applying, by the transmitter's processor, a compensation phase to each modulation symbol to introduce a phase offset between two subsequent modulation symbols, wherein the joint application of the phase ramp and the compensation phase establishes a saw tooth-like phase characteristic over the sequence of modulation symbols.

2. The method of claim 1, wherein the phase ramp is applied in the context of impressing a frequency shift on the modulation symbols.

3. The method of claim 2, wherein the frequency shift is impressed in the context of a signal up-conversion operation.

4. The method of claim 2, wherein the frequency shift amounts to a fraction of a distance between two adjacent sub-carriers assigned to the transmission of modulation symbols.

5. The method of claim 1, wherein the compensation phase is applied in the context of a signal scaling operation.

6. The method of claim 1, wherein the phase offset is introduced between the end of one modulation symbol and the start of the next modulation symbol.

7. The method of claim 1, wherein the compensation phase remains constant during the duration of a single modulation symbol.

8. The method of claim 1, wherein the compensation phase varies from one modulation symbol to the next modulation symbol.

9. The method of claim 1, wherein the compensation phase $\varphi_l$ for modulation symbol l is represented by $$\varphi_l = \left(\sum_{i=0}^{l} -\pi N_{cp,i}/N\right) \mod(2\pi),$$

$N_{cp,i}$ being the length of a prefix of the modulation symbol and N being a constant.

10. The method of claim 1, wherein the compensation phase for one modulation symbol is calculated recursively taking into account the compensation phase calculated for at least one preceding modulation symbol.

11. The method of claim 1, wherein the adjusted phase relationship is compliant with Technical Specification 36.211 of 3GPP Release 8 and/or wherein the modulation symbols are compliant with at least one of a Single-Carrier Frequency Division Multiple Access modulation scheme and an Orthogonal Frequency Division Multiple Access modulation scheme.

12. The method of claim 1, wherein the phase ramp crosses zero after a cyclic prefix of each modulation symbol.

13. A non-transitory computer-readable medium which has an executable computer program product stored thereon, the computer program product comprising program code portions which when executed on a computing device perform following steps:
 applying to a sequence of modulation symbols a phase ramp that continuously increases over the duration of the symbol sequence; and
 applying a compensation phase to each modulation symbol to introduce a phase offset between two subsequent modulation symbols, wherein the joint application of the phase ramp and the compensation phase establishes a saw tooth-like phase characteristic over the sequence of modulation symbols.

14. The non-transitory computer-readable medium of claim 13, wherein the computer program product comprising program code portions which when executed on the computing device further perform the first applying step such that the phase ramp crosses zero after a cyclic prefix of each modulation symbol.

15. A transmitter for adjusting a phase relationship among modulation symbols, comprising:
 a phase shifter adapted to apply to a sequence of modulation symbols a phase ramp that continuously increases over the duration of the symbol sequence; and
 a phase compensator adapted to apply a compensation phase to each modulation symbol to introduce a phase offset between two subsequent modulation symbols, wherein the joint application of the phase ramp and the compensation phase establishes a saw tooth-like phase characteristic over the sequence of modulation symbols.

16. The transmitter of claim 15, wherein the phase shifter is comprised by a frequency shifter adapted to impress a frequency shift on the modulation symbols.

17. The transmitter of claim 15, wherein the frequency shifter is comprised by a signal up-converter.

18. The transmitter of claim 15, further comprising one of a Single-Carrier Frequency Division Multiple Access modulation stage and an Orthogonal Frequency Division Multiple Access modulation stage.

19. The transmitter of claim 15, wherein the phase ramp crosses zero after a cyclic prefix of each modulation symbol.

20. A transmitter for adjusting a phase relationship among modulation symbols, comprising:
 a processor; and
 a memory that stores processor-executable instructions where the processor interfaces with the memory and executes the processor-executable instructions to:
  apply to a sequence of modulation symbols a phase ramp that continuously increases over the duration of the symbol sequence; and
  apply a compensation phase to each modulation symbol to introduce a phase offset between two subsequent modulation symbols, wherein the joint application of the phase ramp and the compensation phase establishes a saw tooth-like phase characteristic over the sequence of modulation symbols.

21. The transmitter of claim 20, wherein the phase ramp crosses zero after a cyclic prefix of each modulation symbol.

22. A device for communicating via a wireless connection with an access network, the device comprising:
 a modulator stage configured to receive data symbols and output a sequence of modulation symbols;
 a signal processing stage, coupled to the modulator stage, the signal processing stage comprises;
  a cyclic prefix inserter;
  a signal scaler, coupled to the cyclic prefix inserter, configured to apply a compensation phase to each modulation symbol to introduce a phase offset between two subsequent modulation symbols; and
  a digital-to-analog signal converter, coupled to the signal scaler; and
 a radio frequency stage, coupled to the digital-to-analog signal converter, the radio frequency stage comprising:
  an IQ modulator, coupled to the digital-to-analog converter, configured to apply to the sequence of modulation symbols a phase ramp that continuously increases over the duration of the symbol sequence, wherein the joint application of the phase ramp and the compensation phase establishes a saw tooth-like phase characteristic over the sequence of modulation symbols.

23. The device of claim 22, wherein the phase ramp crosses zero after a cyclic prefix of each modulation symbol.

* * * * *